(12) United States Patent
Ewerhart et al.

(10) Patent No.: US 6,373,378 B1
(45) Date of Patent: Apr. 16, 2002

(54) ARRANGEMENT FOR VISUALIZING THE ILLUMINATION OF A ZONE IN FRONT OF A VEHICLE BY A HEADLIGHT

(75) Inventors: Frank Ewerhart; Werner Poechmueller, both of Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/468,570

(22) Filed: Dec. 21, 1999

(30) Foreign Application Priority Data

Dec. 29, 1998 (DE) .......................................... 198 60 676

(51) Int. Cl.$^7$ ................................................ B60Q 1/00
(52) U.S. Cl. ..................... 340/425.5; 340/438; 348/115; 348/118; 348/121; 700/36; 700/300
(58) Field of Search ............................... 340/425.5, 438; 345/7; 348/115, 118, 121; 701/36, 300

(56) References Cited

U.S. PATENT DOCUMENTS 5,193,894 A * 3/1993 Lietar ............................ 362/66
5,638,116 A * 6/1997 Shimoura .................... 348/118

FOREIGN PATENT DOCUMENTS

DE 38 26 813 A1 2/1990
DE 3826813 A1 * 2/1990

\* cited by examiner

*Primary Examiner*—Julie Lieu
(74) *Attorney, Agent, or Firm*—Michael J. Striker

(57) ABSTRACT

An arrangement for visualizing the illumination by at least one vehicle headlight of a zone situated in front of the vehicle as considered in the forward driving direction includes a camera mounted on the vehicle and operative for taking a succession of scenes of the environment of the vehicle including the aforementioned zone as the vehicle travels on a roadway in the forward driving direction. A visualization device including a monitor visually renders the scenes obtained from the camera, and a simulated rendition of the region illuminated by the headlight is presented in the succession of scenes appearing on the monitor. The light beam issued by the headlight is presented in a simplification as a light cone. The roadway in front of the vehicle, its edges of the roadway, respective marking lines in the scenes representative of distances in at least one of the direction of travel of the vehicle and transversely thereto, a marker for indicating the instantaneous direction of travel of the vehicle and/or the area of intersection of the simulated light beam with roadway in front of the vehicle, its edges and/or its center are presented on the monitor in an especially emphasized manner.

14 Claims, 4 Drawing Sheets

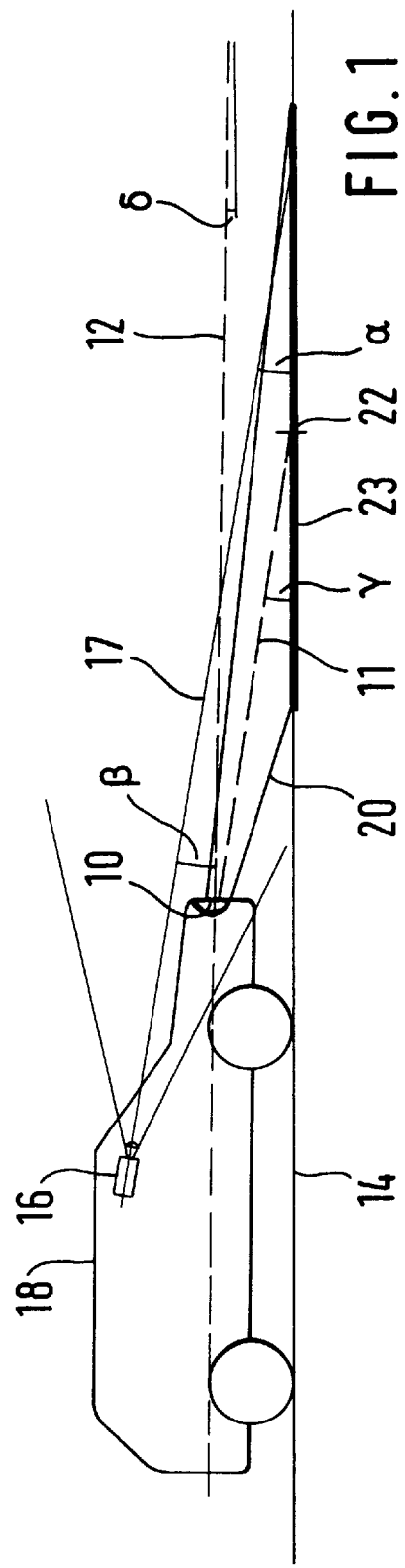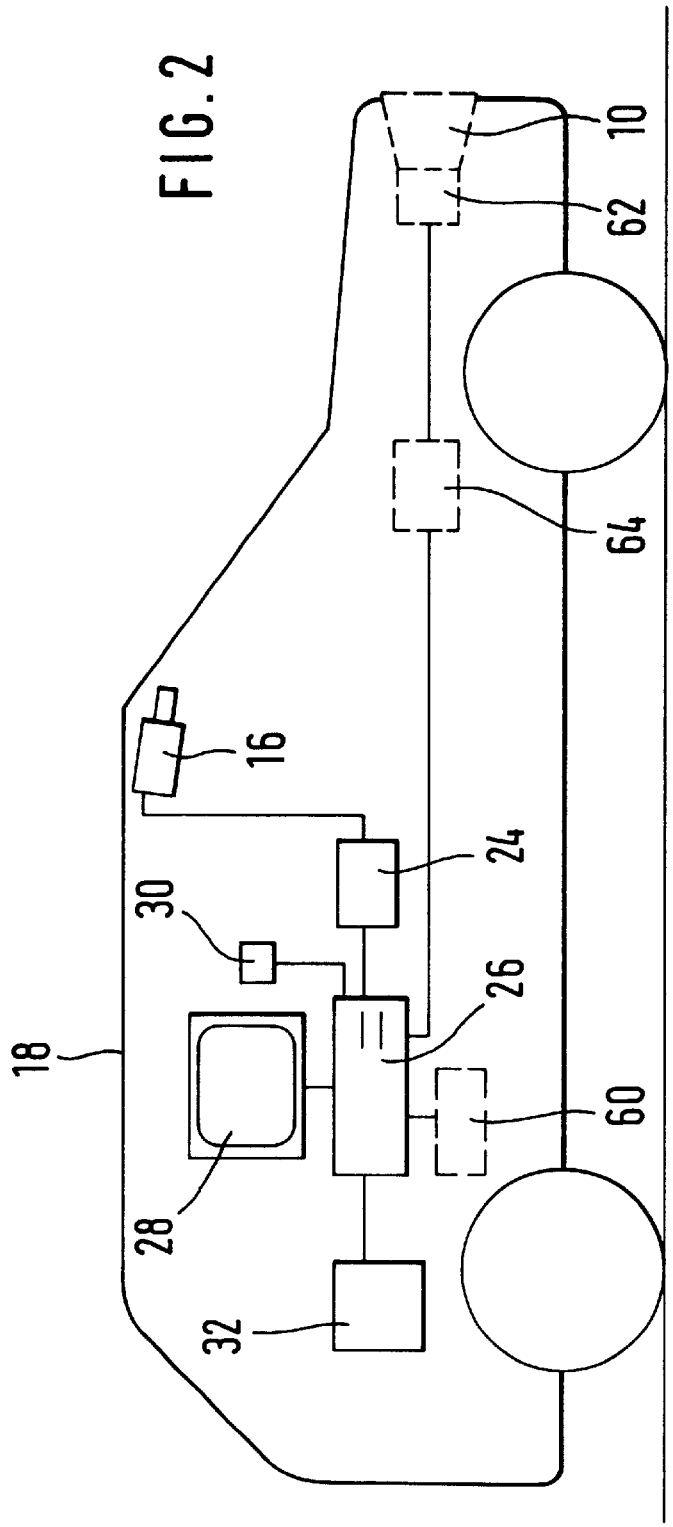

ARRANGEMENT FOR VISUALIZING THE ILLUMINATION OF A ZONE IN FRONT OF A VEHICLE BY A HEADLIGHT

BACKGROUND OF THE INVENTION

1. Field of the Invention

The present invention relates to motor vehicles in general, and more particularly to arrangements for visualizing the areas illuminated by the vehicle headlights as the vehicle travels on a road.

2. Description of the Related Art

There are already known various constructions of arrangements for visualizing, under simulated conditions, the areas that are illuminated by vehicle headlights as the vehicle travels in the forward direction.

One such arrangement is disclosed in German published patent application DE 38 26 813 A1. In this arrangement, an actual scene is captured by a camera as it is being illuminated by an actual headlight. The illumination of the area in front of the vehicle can be examined during the rendition of the captured scene on a rendering device. During the rendition, the illumination provided by the real headlight can be altered in a location-dependent manner, in order to be able to test a different headlight that emits a light beam possessing characteristic properties different from those of the original light beam. A particular drawback of this approach is, however, that the underlying illumination by the actual headlight forms the basis for the rendition, so that it is not possible to examine the illumination occurring while the vehicle is being driven under different operating conditions of the vehicle and/or under changing environmental conditions.

OBJECTS OF THE INVENTION

Accordingly, it is a general object of the present invention to avoid the disadvantages of the prior art.

More particularly, it is an object of the present invention to provide a headlight illumination visualization arrangement that does not possess the drawbacks of the known arrangements of this type.

Still another object of the present invention is to devise an arrangement of the type here under consideration that would make it possible to examine the illumination under a variety of conditions.

It is yet another object of the present invention to design the above arrangement in such a manner as to be able to take into account the dynamically changing operational and environmental conditions as they influence the headlight illumination, without having to actually drive the vehicle under all such conditions.

A concomitant object of the present invention is so to construct the arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in n arrangement for visualizing the illumination by at least one vehicle headlight of a zone situated in front of the vehicle as considered in the forward driving direction. This arrangement includes a camera mounted on the vehicle and operative for taking a succession of scenes of the environment of the vehicle including the aforementioned zone as the vehicle travels on a roadway in the forward driving direction; means including a monitor for visually rendering the scenes obtained from the camera; and means for presenting a simulated rendition of the region illuminated by the headlight in the succession of scenes appearing on the visually rendering means. A particular advantage of the arrangement as described so far is that it enables the person using the same to examine the illumination of the zone ahead of the vehicle by the headlight or headlights under changing conditions without actually having to drive the vehicle under such conditions and having to observe the illumination at the same time.

Advantageously, the arrangement as defined further includes means for capturing the position of the camera with respect to the roadway for each of the scenes in the succession. The capturing means advantageously includes at least one sensor device for capturing the position of the camera during the vehicle travel. These features facilitate the association of the respective illuminated area with the roadway.

According to another advantageous aspect of the present invention, the presenting means includes means for presenting the roadway in front of the vehicle and/or means for presenting respective edges of the roadway in front of the vehicle in an especially emphasized manner. This makes it possible to easily determine and present the illuminated area in the rendition.

It is further advantageous for the presenting means to include means for presenting respective making lines in the scenes representative of distances in at least one of the direction of travel of the vehicle and transversely thereto. This makes it relatively easy to determine the distance of the illuminated area either in front of the vehicle or in the lateral direction from the longitudinal axis of the vehicle from its simulation on the monitor. The device may further include means for indicating the instantaneous direction of travel of the vehicle.

It is also of advantage when the visually rendering means is operative for simulating the roadway as a plane, and when the presenting means includes means for simulating the light beam issued by the headlight as a light cone, and for presenting the area of intersection of the thus simulated light cone with the simulated plane of the roadway in front of the vehicle in an especially emphasized manner. Generally speaking, though, it is advantageous for the presenting means to include means for simulating the light beam issued by the headlight in a simplification as a light cone. In this context, it is also advantageous when the presenting means present respective edges of an area of intersection of the thus simulated light cone with the roadway in front of the vehicle in an especially emphasized manner. Similarly, it is advantageous when the presenting means includes means for presenting the center point of an area of intersection of the thus simulated light cone with the roadway in front of the vehicle in an especially emphasized manner.

According to another facet of the present invention, there is provided means on the vehicle for influencing at least one characteristic property of the light beam issued by the headlight in dependence on at least one of an operating parameter of the vehicle and an environmental condition. Such influencing means may advantageously include at least one sensing device for detecting the at least one of an operating parameter of the vehicle and an environmental condition. Last but not least, the sensing device is operative for sensing the inclination of the vehicle with respect to the roadway, and the influencing means is operative for adjusting the direction in which the headlight issues its light beam in such a manner in dependence on the inclination of the vehicle as determined by the sensing device that the distance at which the light beam is aimed in front of the vehicle remains at least substantially constant. These features facilitate the examination of the illuminating performance of the headlights of different configurations and under varying conditions, with a view toward implementing the thus gathered knowledge in the actual vehicles and/or their headlight systems.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a simplified diagrammatic sectional view of an automobile equipped with a camera and at least one headlight and situated on a roadway;

FIG. 2 is a view similar to that of FIG. 1 but showing less of the environment of, but more of visualizing and related equipment accommodated in, the automobile;

DETAILED DESCRIPTION OF THE PREFERRED EMBODIMENT

Figure 3:
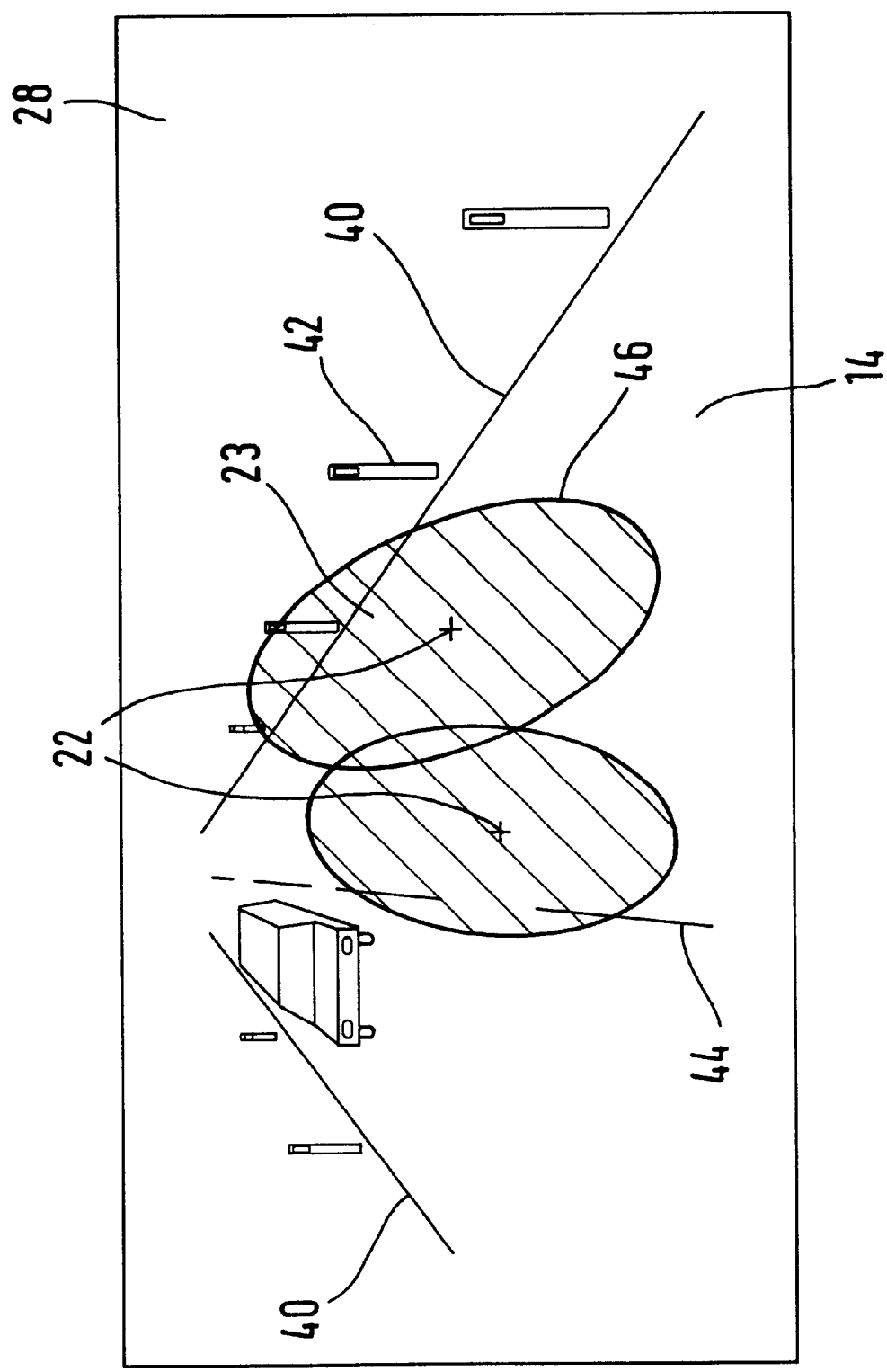
FIG. 3 is a diagrammatic view depicting a first scene as it may be or have been taken by the camera shown in FIGS. 1 and 2 and indicating respective illumination zones of two transversely spaced headlights corresponding to that shown in the previous Figures.

Referring now to the drawing in detail, and first to FIG. 1 thereof, it may be seen that it depicts, in a simplified, diagrammatic fashion, a vehicle, more particularly a motor vehicle, which is shown to be provided at its front end as considered in the driving direction with at least one headlight 10. Preferably, though, the vehicle is equipped with two headlights 10 that are arranged at a transverse spacing from each other substantially symmetrically to a longitudinal axis 12 of the vehicle; however, only one of such headlights 10 would be visible in FIG. 1 in any event. The vehicle is supported on and, for the purposes of the present discussion, is deemed to travel along a roadway 14. A camera 16 is arranged in or on the aforementioned vehicle for joint travel with the latter. The camera 16 is preferably arranged as high on the vehicle as possible or feasible, such as, when in the interior of the vehicle, behind the upper edge region of the windshield. The vehicle includes a vehicle body 18 on which the headlight or each of the headlights 10 is mounted and the inclination of which with respect to the roadway 14 may change even as far as its longitudinal axis 12 is concerned as a result of spring action encountered at the undercarriage of the vehicle.

An optical axis of the headlight 10 is identified in FIG. 1 by the reference numeral 11, while an optical axis of the camera 16 is indicated at 17. The light bundle or beam that emanates from the headlight 10 when the latter is in use is represented in the drawing, in a simplification, as a light cone 20. The optical axis 11 of the headlight 20 extends along a course that is inclined at an angle y with respect to the surface of the roadway 14. The optical axis 17 of the camera 16 extends along a course that encloses an angle α with the surface of the roadway 14 and an angle β with the longitudinal axis 12 of the vehicle body 18. The angle of inclination of the vehicle body 18, which equals the angle of the longitudinal axis 12 of the vehicle body 18 with the roadway surface, is indicated by the reference character δ. The reference number 22 identifies the point at which the optical axis 11 of the headlight 10 intersects the surface of the roadway 14. The intersection of the light beam cone 20 with the surface of the roadway 14 yields an intersection zone 23 which thus constitutes the region of the roadway 14 that is illuminated by the headlight 10. As the vehicle travels on the roadway 14, the camera 16 receives images of the environment in front of the vehicle and, when the headlights 10 are in operation, even the illumination caused by the light beams 20 emitted by the headlights 10.

In FIG. 2, the vehicle is again presented in a simplified manner and is shown to be equipped with elements of a visualization arrangement for the presentation of the illumination brought about in front of the vehicle by the action of the headlights 10. The camera 16 is connected with an A/D converter 24 by means of which the signals issued by the camera 16 are digitized. The A/D converter 24 is of the type that is referred to as a frame grabber. The output of the A/D converter 24 is connected with a computing unit 26 in which the digitized camera signals are evaluated. The computing unit 26 is, in turn, connected with a display device 28 that is shown to be constituted by a monitor on the screen of which the scenes received by the camera 16 are displayed in a simplified fashion. The A/D converter 24, the computing unit 26, and the monitor 28 need not be accommodated in the vehicle, though; rather, they can be situated remotely from the vehicle, for instance in an evaluation laboratory.

The camera 16 is preferably constructed as a video camera which preferably exhibits a non-linear characteristic response during the conversion of the light or optical signals into corresponding electronically processable electric current or voltage signals. Preferably, the light-sensitive sensor of the camera 16 has an intensity signal characteristic curve with a decreasing slope, so that the camera 16 possesses an enhanced brightness dynamic response. In this manner, an overexposure of the image can be avoided. In this respect, a logarithmic intensity signal characteristic curve is particularly advantageous, inasmuch as in this case the contrast resolution is constant over the entire brightness range. A further advantageous development is the use of a light-sensitive sensor in the camera 16 that was produced by resorting to a CMOS manufacturing process, since it effectively avoids or prevents the occurrence of distracting or disruptive blooming and smearing effects.

There is further provided at least one sensor device 30 by means of which the inclination angle δ of the vehicle body 18 with respect to the surface of the roadway 14 can be ascertained. In the alternative, the angle α of inclination with respect to the surface of the roadway 14 can be determined instead of the inclination angle δ. Namely, when the camera 16 is rigidly connected with the vehicle body 18, the inclination angle δ of the vehicle body 18 with respect to the surface of the roadway 14 and the inclination angle α of the optical axis 17 of the camera 16 with respect to the surface of the roadway 14 can be recalculated into each other.

The sensor device 30 can be constructed, for instance, as a driving dynamics sensor device, especially as a travel distance sensor, an angle detector sensor, or as an acceleration sensor arrangement. In this case, the resilient movement of the vehicle body 18 relative to the undercarriage, or its position in relation to the line going to the Earth's center of gravity, can be determined by measuring the travel distance, inclination angle or acceleration. The roadway 14 is assumed to be or modeled as a planar surface in the course of use of such sensor arrangements 30. In the alternative, the sensor arrangement 30 can also operate in accordance with a laser measuring method, in which case a laser is connected with the vehicle body 18 and emits a laser beam toward the roadway 14, while the distance from the roadway 14 is determined by resorting to a triangulation evaluation method or the travel time. In a further alternative, the sensor arrangement 30 may operate in accordance with a video-based approach, for instance with an image-based driving track recognition method, with a monocular plane estimation method from a temporally successive images, or a plane estimation method from stereo image pairs. When sensor arrangements 30 that operate in accordance with either the laser measuring method or a video-based measurement method, the roadway 14 is advantageously, in order to keep the measuring expense at a relatively low level, assumed to be or modeled as a plane; however, at a somewhat greater expense, it may also be assumed to be or modeled as a surface that deviates from a plane.

The visualization arrangement may further include, as a further component thereof, a storage device 32 by means of which the data obtained from the camera 16, from the computing unit 26 as well as from the sensor arrangement 30 can be stored for use at a later point in time.

The camera 16 receives during the travel of the vehicle images of the environment situated ahead of the vehicle as considered in the direction of travel, and especially the roadway 14. Herein, the camera 16 especially receives the images of the region 23 that is illuminated by the headlight or headlights. The headlight or headlights may be operational (on) or not (off) during the taking of the successive scenes or image frames by the camera 16. The images obtained from the camera 16 may be recorded to a video tape, from which the signals obtained from the camera 16 can be reconstructed and supplied to the A/D converter 24. The scenes received by the camera 16 and the associated signals processed by the A/D converter 24 as well as the computing unit 24 are displayed in a simplified manner on the monitor 28.

In FIG. 3, there is depicted a first scene displayed on the monitor 28. The roadway 14 in front of the vehicle is shown on the monitor; herein, respective lateral edges 40 of the roadway 14 are emphasized by respective lines. At the edges 40 of the roadway 14, there may also be situated and represented respective marking posts 42. The center of the roadway 14 may be marked by a central strip 44. The region of the roadway 14 and the lateral region located beyond the latter that are illuminated by the light beam are indicated in this scene in a particularly emphasized manner. These regions correspond to the intersection area 23 of the light beam emitted by the headlight 10 that is assumed to be a light cone for the sake of simplicity. In FIG. 3, there are illustrated two of such intersection areas 23, wherein the area 23 situated to the right is illuminated by the right headlight 10 whereas the area 23 located at left is illuminated by the left headlight 10. The areas 23 are substantially in coterminous overlapping relationship at a greater distance in front of the vehicle and they significantly deviate from each other only at a smaller distance from the vehicle. The intersection points 22 of the optical axes 11 of the headlights 10 with the roadway 14 are emphasized as respective crosses, so that they can be clearly recognized. At greater distances from the vehicle, the optical axes 11 of the two headlights 10 have at least approximately the same intersection point 22.

Respective edges 46 of the intersection areas 23 illuminated by the light cones 20 emitted by the headlights 10 may be emphasized in the display. The intersection areas 23 may be lightened or darkened in order to visually distinguish them from the remainder of the scene. Here, the intersection areas 23 either may be lightened or darkened in a binary fashion, or they may be lightened or darkened gradually. The illumination intensity distribution as it is produced by the characteristic of the light beams emitted by the headlights 10 may even be indicated by the gradual lightening or darkening, when the light cones 20 are modeled in a correspondingly more expensive manner.

Figure 4:
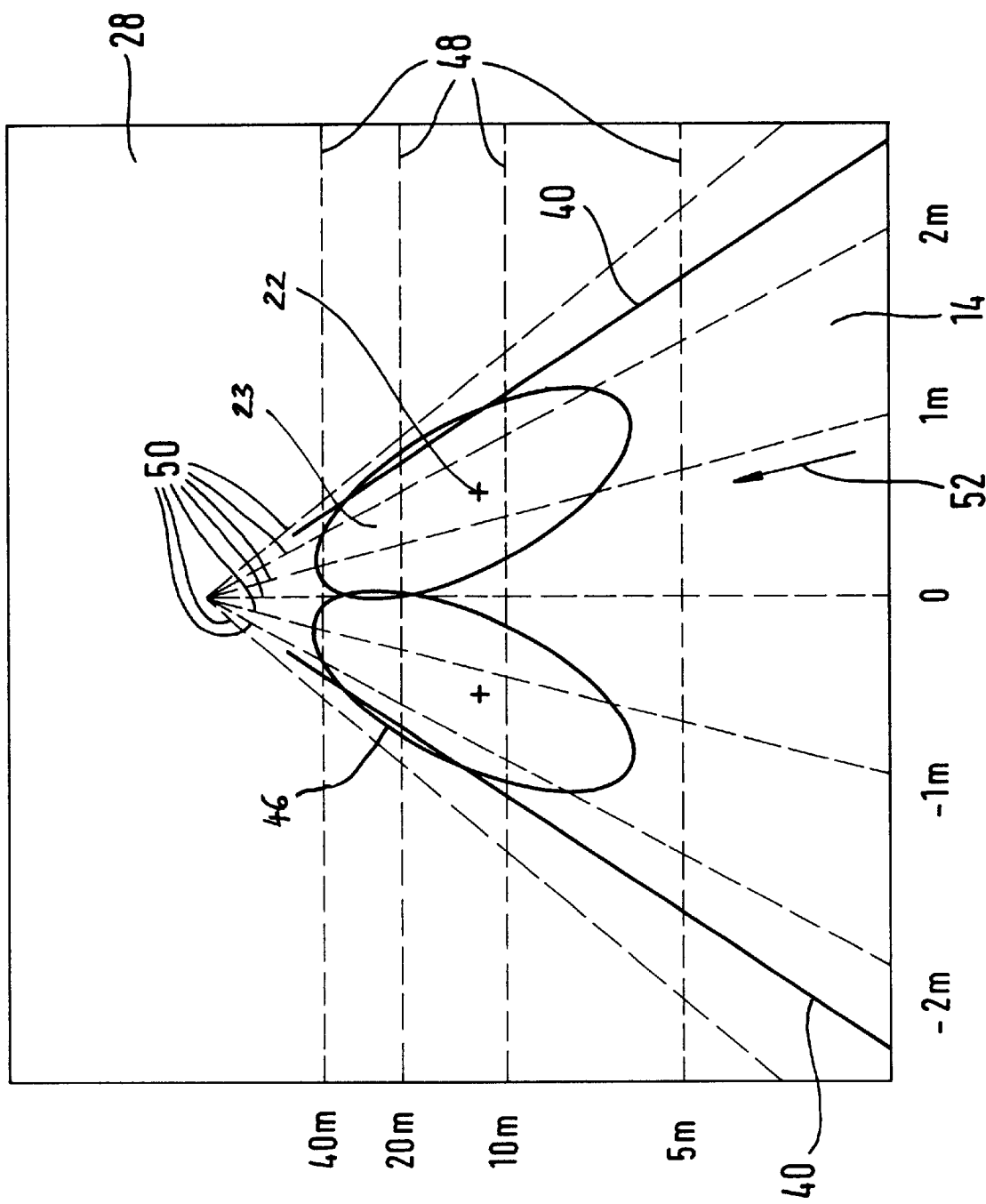
FIG. 4 is a view corresponding to that of FIG. 3 but presenting a second scene.

Additionally, as illustrated in FIG. 4 of the drawing, markings for distances in the longitudinal direction, that is in the direction of the longitudinal axis 12, or in the transverse direction, that is perpendicular to the longitudinal axis 12, may be depicted in the scene in front the vehicle. As markings for the distances in the longitudinal direction, there may be inserted in a perspective representation respective horizontal lines 48, which correspond to predetermined distances from each other ahead of the vehicle. The lines 48 facilitate the estimation and the comparability of the distance of the intersection areas 23 from the vehicle and hence the reach of the light cones 20 emitted by the headlights 10. As markings for the distances in the transverse direction, there may be inserted respective lines 50 that extend parallel to the longitudinal axis 12 as considered in a perspective representation and correspond to predetermined distances from each other in a direction perpendicular to the longitudinal axis 12 of the vehicle. The lines 50 facilitate the estimation and the comparability of the positions and widths of the intersection areas 23 as considered normal to the longitudinal axis 12 of the vehicle. In the scene, there by be additionally indicated, as also shown in FIG. 4 of the drawing, the trajectory of the vehicle, that is the instantaneous direction of movement or travel of the vehicle, by means of an arrow 52.

The previously explained additional markings or other emphasizing features provided in the scene facilitate the quantification, the comparison and the optimization of the light cones 20 emitted by the headlights 10. The visualization arrangement serves the purpose of capturing on a video basis—that is as received by the camera 16—the environment of the vehicle that is situated in front of the vehicle in the zone to be illuminated by the light beams emitted by the headlights, and to make possible the visualization of a modeled or simulated illumination of the affected regions of the roadway 14 by the headlights 10 in a video presentation.

As already mentioned before, the sensor arrangement 30 determines the angle δ of inclination of the vehicle body 18 that is associated with each of the scenes. The computing unit 26 simulates the lighting or illumination by the light beams emitted by the headlights 30 that are modeled in a simplified way as respective cones 20, and the regions illuminated by such cones are indicated in the video images as intersection areas 23 on the roadway 14. On the basis of the video picture, it can be examined what positions the intersection zones 23 illuminated by the light cones 20 assume on the roadway 14 when a certain adjustment of the headlights 10 is simulated.

The adjustment of the headlights 10 is simulated by a control system. In this context, it can be provided that the adjustment of the headlights 30 is changed in dependence on the inclination angle δ of the vehicle body 18. Herein, a system for lighting distance regulation can be simulated which so changes the adjustment of the headlights in dependence on the inclination angle δ of the vehicle body 18 that the illumination distance of the headlights 10 is at least substantially constant. Herein, the illumination distance of the headlights 10 corresponds to the spacing of the illumination zones 23 from the vehicle that is to be maintained at least substantially constant. Should the rear portion of the vehicle body 10 resiliently move down on its suspension at the rear axle of the vehicle, then, in the absence of such an illumination distance regulating system, there would result too great an illumination distance of the headlights 10, leading to dazzling of the oncoming traffic. Such a resilient downward movement of the vehicle body 18 on the rear axle can occur can result either from loading of the vehicle, or from the effect of driving over roadway unevenesses, or from the effects of acceleration. On the other hand, should the vehicle body 18 move down resiliently on its suspension at the front axle of the vehicle, then, in the absence of such an illumination distance regulating system, there would result too small an illumination distance of the headlights 10, as a result of which the roadway 14 in front of the vehicle would not be illuminated to a sufficient extent and the sight distance of the driver of the vehicle would be severely limited.

The aforementioned illumination distance regulating system changes the adjustment of the headlight 10 or at least of its reflector relative to the vehicle body 18, by means of one or more adjusting elements 62, in such a manner that the illumination distance of the headlights 10 is at least substantially constant for all inclination angles δ of the vehicle body 18. The illumination distance regulating arrangement includes at least one sensor arrangement 60 by means of which the inclination angle δ of the vehicle body 18 is detected at least mediately. The sensor arrangement 60 can be constructed in the same or similar manner as the previously explained sensor arrangement 30 of the visualization arrangement. The signal issued by the sensor arrangement 60 are processed by a control arrangement 64, and the adjustment elements 62 are controlled in such a manner as to bring about the corresponding adjustment of the headlights 10.

The sensor arrangement 30 of the visualization arrangement is necessary for the determination of the position of the camera 16 relative to the roadway 14, whereas the position of the camera 16 in turn is necessary for enabling the correct positioning of the roadway in the rendition of the captured scene on the monitor 28, and for making it possible to correctly present the remaining information, such as for instance the roadway edges 40, the marking posts 42, the central or dividing strip 44, the longitudinal distance lines 48, the lateral distance lines 50, as well as the trajectory 52, in the scene. By means of the control system, the light beams emitted from the headlights 10 are modeled in a simplified manner in accordance with a predetermined model, for instance in the shape of the light cone 20. The control system further simulates the adjustment of the headlights 10 as it would be performed in real life by the illumination distance regulating arrangement in dependence on the signals derived from its sensor arrangement 60. Then, in the scene presented on the monitor 28, there can be depicted the zones 23 that are illuminated by the simulated light cone. The position of the zones 23 can be easily and quickly determined on the base of the additional information present in the scene.

Figure 5:
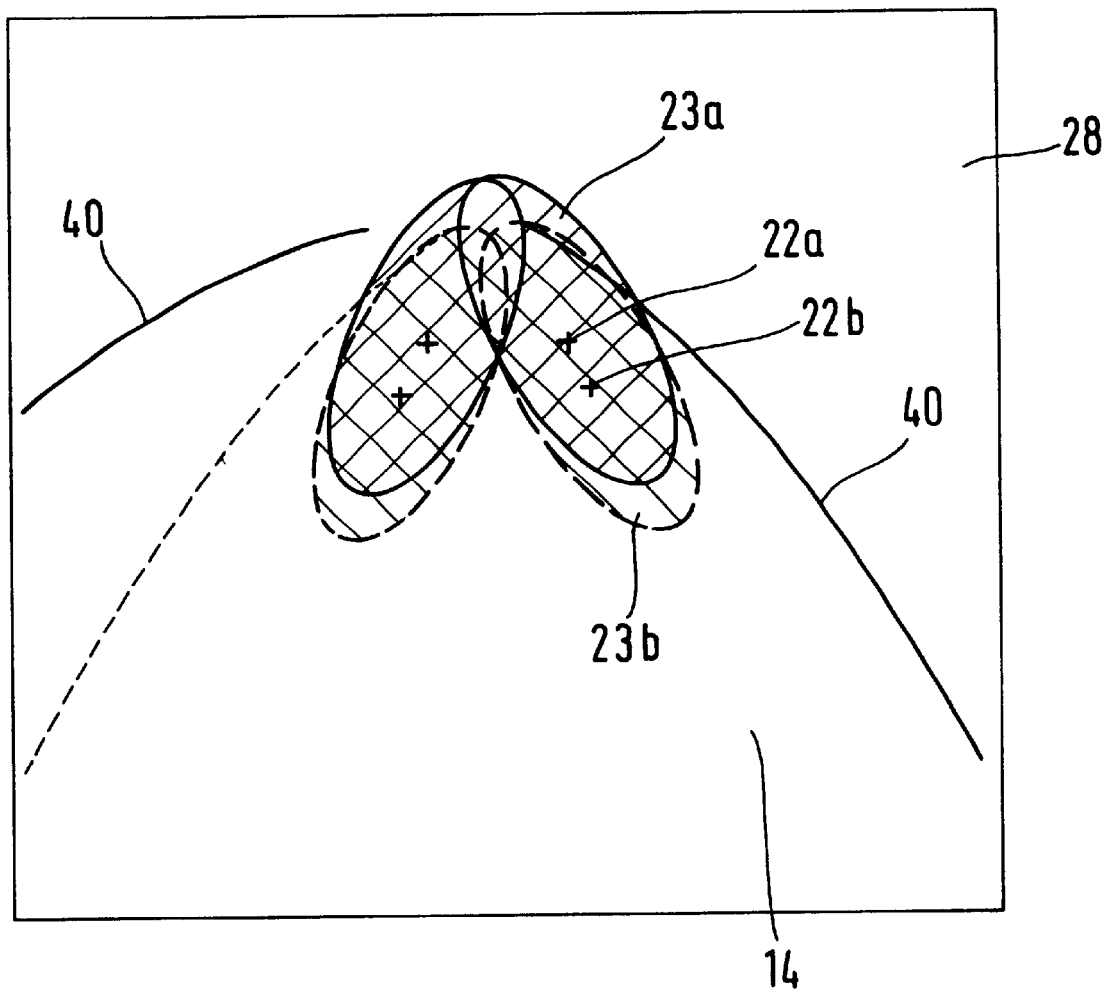
FIG. 5 is another view akin to that of FIG. 3 but showing a third scene.

It can be also provided that zones 23 illuminated under different illuminating conditions are presented in the scene, as it is the case in FIG. 5 of the drawing. At one adjustment of the headlights 10, zones 23a are illuminated, while zones 23b are illuminated at another adjustment of the headlights 10. The points of intersection of the optical axes 11 of the headlights 10 with the roadway 14 for the two different adjustments of the headlights 10 are indicated at 22a and 22b. In this manner, for instance, adjustments of the headlights 10 performed on the basis of information obtained by different sensor arrangements 30 or and/or by different adjusting arrangements 64 of the illumination distance regulation system can be compared, for instance during the approach of an upward incline or a crest on the roadway 14. In this manner, it is possible to obtain a quick comparison of the zones 23 that are illuminated with different adjustments of the headlights 10. So, for instance, this process may be based on adjustments of the headlights 10 that are performed by different illuminating distance regulation systems which are compared with one another with respect to the positions taken by the zones 23 illuminated by the headlights 10 and with respect to the speed at which the adjustment of the headlights 10 takes place in dependence on the inclination angle δ of the vehicle body 18 when using different light distance regulation systems.

In an alternative to, or in addition to, the above-discussed illumination distance regulation systems, there can be provided a system by means of which there is performed an adjustment of the aiming position of the headlights in the horizontal direction and/or a change of any other characteristic of the light beam emanating from the headlights 10 in dependence on at least one operating parameter of the vehicle and/or at least one environmental condition existing at the instantaneous position of the vehicle. The adjustment of the headlights 10 or of the characteristic properties of the light beams emitted by such headlights 10 can take place, for instance, in dependence on the speed of movement of the vehicle or the steering positions of the vehicle wheels as an operating parameter. However, the adjustment of the headlights 10 or of the characteristic properties of the light beams emitted by such headlights 10 can take place, for example, in dependence on the weather conditions and/or other vehicles or objects present in the environment of the vehicle as an environmental condition. For the detection of the operating parameter(s) and/or the environmental condition(s), one or more sensor arrangements are provided on the vehicle, being connected with a control device by which the adjustment of the headlights 10 and/or the characteristic of the light beam emitted by the respective headlight 10 is changed via one or more adjustment elements.

It will be understood that each of the elements described above, or two or more together, may also find a useful application in other types of constructions differing from the type described above.

While the present invention has been described and illustrated herein as embodied in a specific construction of a motor vehicle headlight illumination simulation arrangement, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim that:

1. An arrangement for visualizing the illumination by at least one vehicle headlight of a zone situation in front of the vehicle as considered in the forward driving direction, comprising a camera mounted on the vehicle and operative for taking a succession of scenes of the environment of the vehicle including the aforementioned zone as the vehicle travels on a roadway in the forward driving direction; means including a monitor for visually rendering the scenes obtained from the camera; and means for presenting a simulated rendition of the region illuminated by the headlight in the succession of scenes appearing on the visually rendering means, wherein when said simulated rendition is presented, illumination produced by the headlight is simulated.

2. The arrangement as defined in claim 1, and further comprising means for capturing the position of the camera with respect to the roadway for each of the scenes in the succession.

3. The arrangement as defined in claim 2, wherein said capturing means includes at least one sensor device for capturing the position of the camera during the vehicle travel.

4. The arrangement as defined in claim 1, wherein said presenting means includes means for presenting the roadway in front of the vehicle in an especially emphasized manner.

5. The arrangement as defined in claim 1, wherein said presenting means includes means for presenting respective edges of the roadway in front of the vehicle in an especially emphasized manner.

6. The arrangement as defined in claim 1, wherein said presenting means includes means for presenting respective marking lines in the scenes representative of distances in at least one of the direction of travel of the vehicle and transversely thereto.

7. The arrangement as defined in claim 1, wherein said presenting means includes means for indicating the instantaneous direction of travel of the vehicle.

8. The arrangement as defined in claim 1, wherein said visually rendering means is operative for simulating the roadway as a plane, and wherein said presenting means includes means for simulating the light beam issued by the headlight as a light cone, and for presenting the area of intersection of the thus simulated light cone with the simulated plane of the roadway in front of the vehicle in an especially emphasized manner.

9. The arrangement as defined in claim 1, wherein said presenting means includes means for simulating the light beam issued by the headlight in a simplification as a light cone.

10. The arrangement as defined in claim 1, wherein said presenting means includes means for simulating the light beam issued by the headlight as a light cone, and for presenting respective edges of an area of intersection of the thus simulated light cone with the roadway in front of the vehicle in an especially emphasized manner.

11. The arrangement as defined in claim 1, wherein said presenting means includes means for presenting the center point of an area of intersection of the thus simulated light cone with the roadway in front of the vehicle in an especially emphasized manner.

12. The arrangement as defined in claim 1, and further comprising means on said vehicle for influencing at least one characteristic property of the light beam issued by the headlight in dependence on at least one of an operating parameter of the vehicle and an environmental condition.

13. The arrangement as defined in claim 12, wherein said influencing means includes at least one sensing device for detecting said at least one of an operating parameter of the vehicle and an environmental condition.

14. The arrangement as defined in claim 13, wherein said sensing device is operative for sensing the inclination of the vehicle with respect to the roadway; and wherein said influencing means is operative for adjusting the direction in which the headlight issues its light beam in such a manner in dependence on the inclination of the vehicle as determined by said sensing device that the distance at which the light beam is aimed in front of the vehicle remains at least substantially constant.

* * * * *